US007400650B1

(12) United States Patent
DiMambro

(10) Patent No.: US 7,400,650 B1
(45) Date of Patent: Jul. 15, 2008

(54) SYSTEM AND METHOD FOR ELIMINATING STREAMS FRAMEWORK OVERHEAD IN DATA COMMUNICATIONS

(75) Inventor: Francesco DiMambro, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 609 days.

(21) Appl. No.: 11/047,307

(22) Filed: Jan. 31, 2005

(51) Int. Cl.
*H04J 3/16* (2006.01)
(52) U.S. Cl. ............... 370/469; 719/314; 719/321; 710/11
(58) Field of Classification Search ........... 370/465, 370/474, 469
See application file for complete search history.

(56) References Cited

U.S. PATENT DOCUMENTS

| | | | | |
|---|---|---|---|---|
| 5,278,834 | A * | 1/1994 | Mazzola ............... | 370/469 |
| 5,815,707 | A * | 9/1998 | Krause et al. .......... | 719/321 |
| 5,832,239 | A * | 11/1998 | Gavin et al. ........... | 710/105 |
| 6,070,198 | A * | 5/2000 | Krause et al. .......... | 719/321 |
| 6,691,175 | B1 * | 2/2004 | Lodrige et al. ......... | 719/314 |
| 6,920,635 | B1 * | 7/2005 | Lodrige et al. ......... | 719/314 |
| 7,269,171 | B2 * | 9/2007 | Poon et al. ............. | 370/392 |
| 2003/0231659 | A1 * | 12/2003 | DiMambro et al. ..... | 370/473 |

OTHER PUBLICATIONS

Streams Programming Guide, Sun Microsystems, Inc., Jan. 2005.*

* cited by examiner

*Primary Examiner*—Charles D. Garber
*Assistant Examiner*—Cassandra Decker
(74) *Attorney, Agent, or Firm*—Park, Vaughan & Fleming LLP

(57) ABSTRACT

A system and method for improving the efficiency with which data communications are passed through a protocol stack. Protocol layer modules within a protocol stack built upon the Streams framework are modified to establish tight embraces between adjacent modules. A tight embrace may be established by passing from one, upper, protocol layer module to its adjacent lower protocol layer module a pointer or reference to the upper module's functionality (e.g., rput) for reading a data communication into the upper module from the lower module. Similarly, the lower module passes the upper module a pointer or reference to its functionality (e.g., wput) for writing a data communication into the lower module from the upper module. After a tight embrace is established, the protocol layer modules can directly invoke each other's functionality, without incurring the overhead associated with the Streams framework's "canputnext" and "putnext" messages.

16 Claims, 3 Drawing Sheets

SYSTEM AND METHOD FOR ELIMINATING STREAMS FRAMEWORK OVERHEAD IN DATA COMMUNICATIONS

BACKGROUND

This invention relates to the field of computer communications. More particularly, a system and methods are provided for performing data communications through a protocol stack without incurring the overhead normally imposed by the Streams framework.

The Streams framework, or subsystem, provides a flexible programming model for communication services within computer systems executing a Unix-based operating system. The Streams subsystem defines standard interfaces within kernel space, to provide a modular approach to implementation of a network protocol stack. Within the Streams framework, each protocol layer's module normally communicates through the framework, which provides system calls, kernel resources (e.g., queues) and kernel routines for transferring messages along communication streams built upon the protocol stack.

For each communication stream, the basic Streams model provides a downstream queue for outgoing messages and an upstream queue for incoming messages. Messages are passed up and down the stream, traversing modules which provide the protocol functionality. Transferring a message or communication from one module to the next involves two functions, "canputnext" and "putnext." The canputnext function determines whether Streams resources (e.g., the queues) can accommodate the message, while the putnext function takes the message and passes it from one module to the next within the stream. When passed from one module to another, a message leaves the first module and enters the Streams framework then the streams framework calls the next module to pass the message on.

It is possible to add and remove modules from a stream at any time during operation of the stream. The ability to add and remove modules requires that the stream be stopped so that the reconfiguration can be effected with no impact to the communications already queued on the stream.

The Streams framework allows queues to build up between modules if the modules have perimeters defined. The perimeters ensure that once in the perimeter, whether it is an outer or inner perimeter for the module, mutual exclusive access to the driver/module-specific data structures is protected by the perimeter.

While perimeters generalize the locking and queuing required to implement a protocol stack, they can cause unnecessary processing overhead when a streams module is implemented with maximum multi-threading capability. In particular, while the Streams framework allows completely multi-threaded modules, it still requires a stream be locked via canputnext and putnext functions.

While executing these functions, the Streams framework employs mutual exclusion (i.e., mutex) locks to control access to a communication stream's queues and to ensure that the stream is not changed (e.g., to add or remove a module) while it is active. Thus, the Streams framework locks the communication stream, accepts the communication (e.g., queues it) and then unlocks the stream. This procedure must be followed for every communication transfer from one module to another.

The continual locking and unlocking of Streams resources causes a noticeable degradation in communication performance. Even though the addition/removal of modules to/from a communication stream may be relatively rare events, the Streams framework imposes a penalty on stream communications in order to accommodate such changes.

One attempted method for avoiding the Streams framework overhead described above involves merging adjacent protocol modules. However, this can be quite difficult, in order to address complexities of both modules. Also, merger of just two modules may not be enough. For example, when attempting to improve the efficiency of passing messages between TCP and IP, UDP (User Datagram Protocol) may also need to be merged since IP underlies both TCP and UDP.

When modules are merged, the resulting protocol stack becomes much less flexible. For example, a third-party module that could normally be inserted between the modules (e.g., a firewall module inserted between IP and a device driver module) cannot easily be added to the modules after they are merged. In addition, it may require substantial time and effort to combine the modules and test the result to ensure all ramifications of the merger are understood and addressed.

Therefore, there is a need for a system and method for passing data communications between protocol layer modules within a communication stream, without incurring the Streams framework overhead normally associated with such activity, and without merging the modules.

SUMMARY

In one embodiment of the invention, a system and methods are provided for improving the efficiency with which data communications are passed through a protocol stack, by establishing a tight embrace between adjacent protocol layer modules. In a tight embrace, a first protocol layer module can directly invoke a second, adjacent, module's functionality for transferring a data communication to the second module from the first, without incurring the overhead associated with the Streams framework's canputnext and putnext messages.

In this embodiment, a tight embrace is established by passing from the first protocol layer module to the second protocol layer module a pointer or reference to the first module's functionality (e.g., rput) for reading a data communication into the first module from the second module. Similarly, the second protocol layer module passes the first protocol layer module a pointer or reference to its functionality (e.g., wput) for writing a data communication into the second module from the first module.

Illustratively, tight embraces are employed to pass data communications. Control messages, including messages for requesting, responding and completing tight embraces, may continue to be passed via the Streams framework.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for conveying data communications through a protocol stack implemented within the Streams framework. In this embodiment, a communication (e.g., a packet) is transferred from a first layer of the protocol stack to a second layer without invoking the "canputnext" or "putnext" functions of the Streams framework and incurring the processing overhead normally associated with transferring communications through the stack.

These functions cause the framework to determine whether it can accept a communication ("canputnext") from the first layer's module and, if it can, to then accept and queue the communication ("putnext") for the second layer's module. In implementing these functions the Streams framework applies mutual exclusion (mutex) locking to maintain the integrity of the communication stream. The mutex locking allows the framework to accommodate a change to the protocol stack, through the addition or removal of a protocol layer. The mutex locking caused by the canputnext and putnext functions necessarily degrades the throughput of data communications.

In an embodiment of the invention, adjacent protocol layers within a protocol stack engage in a "tight embrace." The tight embrace allows one layer to directly invoke the other layer's communication handling routines to accept a data communication, thereby bypassing the Streams framework and avoiding the overhead incurred by the canputnext and putnext messages.

Figure 1:
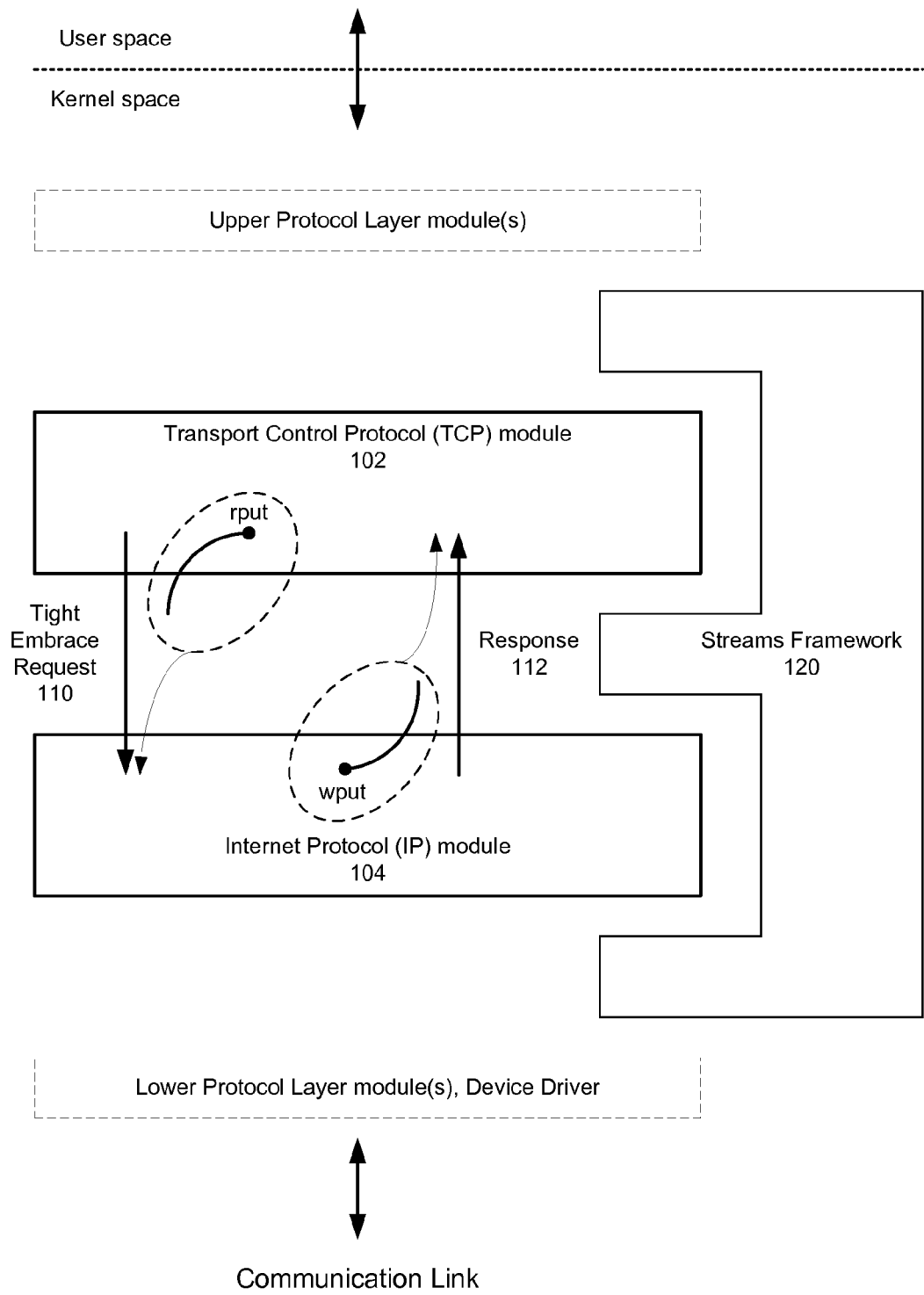
FIG. 1 is a block diagram depicting a data communication protocol stack implemented within the Streams framework, in accordance with an embodiment of the present invention.

FIG. 1 is a block diagram illustrating a protocol stack, implemented within the Streams framework, in which a tight embrace may be established between two protocol layer modules, according to one embodiment of the invention.

The protocol stack may include any number of protocol layers; for each layer, a module of executable code (e.g., firmware, software) is configured to implement the corresponding protocol. Although only modules 102 and 104 for the Transport Control Protocol (TCP) and Internet Protocol (IP) layers are shown in FIG. 1, in other embodiments of the invention any number of additional protocol layers may be included. For example, in a computer system executing the Solaris® operating system by Sun Microsystems, Inc., a protocol layer module for sockfs (socket file system) may be situated between the TCP module and user space, and a device driver module may be situated between the IP module and the communication link.

As described above, Streams framework 120 provides functions for conveying messages (e.g., data communications, control messages) within the protocol stack. In the illustrated embodiment of the invention, the Streams framework may continue to be used to convey control messages through the protocol stack (i.e., in the control plane) while data communications (i.e., in the data plane) are passed through a tight embrace.

To establish a tight embrace, a first protocol layer module (e.g., TCP module 102) issues a tight embrace request (e.g., request 110) to a second module (e.g., IP module 104). The request may be passed as a control (e.g., M_CTL) message.

The request includes a pointer, entry point or other reference to the first module's function(s) for transferring a message into the first module from the second. The function(s) may include the functionality normally invoked by the Streams framework as part of a putnext function call for reading a packet or other communication from the second module into the first module. For example, the functions may include TCP_rput and/or TCP_rsrv.

If the second module is capable of engaging in a tight embrace, its response (e.g., response 112), which may be copied from the request, will include a pointer, entry point or other reference to the second module's function(s) for transferring a message into the second module from the first. The function(s) may include the functionality normally invoked by the Streams framework as part of a putnext function call for writing a packet or other communication from the first module into the second module. For example, the functions may include IP_wput and/or IP_wsrv.

The first module may ensure that the response came from the correct module, by examining an identifier of the issuing module, for example.

Any number of protocol layer modules may establish tight embraces with adjacent protocol layer modules. Illustratively, if the protocol stack is changed or reconfigured (e.g., to add or remove a protocol layer module), tight embraces may be re-established afterward. A first control message may precede a reconfiguration event, to stop a communication stream or resume using the canputnext and putnext messages to pass data communications. After the reconfiguration, another control message may be used to restart the stream and re-establish tight embraces.

For example, a firewall module may be installed between an IP protocol layer module and an underlying driver module. This would disrupt a tight embrace previously established between the IP and driver modules. The firewall module may be inserted in a normal manner, by stopping the data plane, installing the module, and restarting the data plane. Afterwards, the IP module could then attempt to establish a tight embrace with the firewall module, and the firewall module could attempt to establish a tight embrace with the driver module.

In different embodiments of the invention, a protocol layer module's ability to support or engage in a tight embrace may be implemented in different ways. For example, instead of calling the Streams functions canputnext and/or putnext, a module may directly call an adjacent module's wput or rput function (and, possibly, wsrv or rsrv). Alternatively, a module's calls to the Streams framework's putnext and/or canputnext functions may be modified to call wput or rput instead of the Streams functions.

Figure 2:
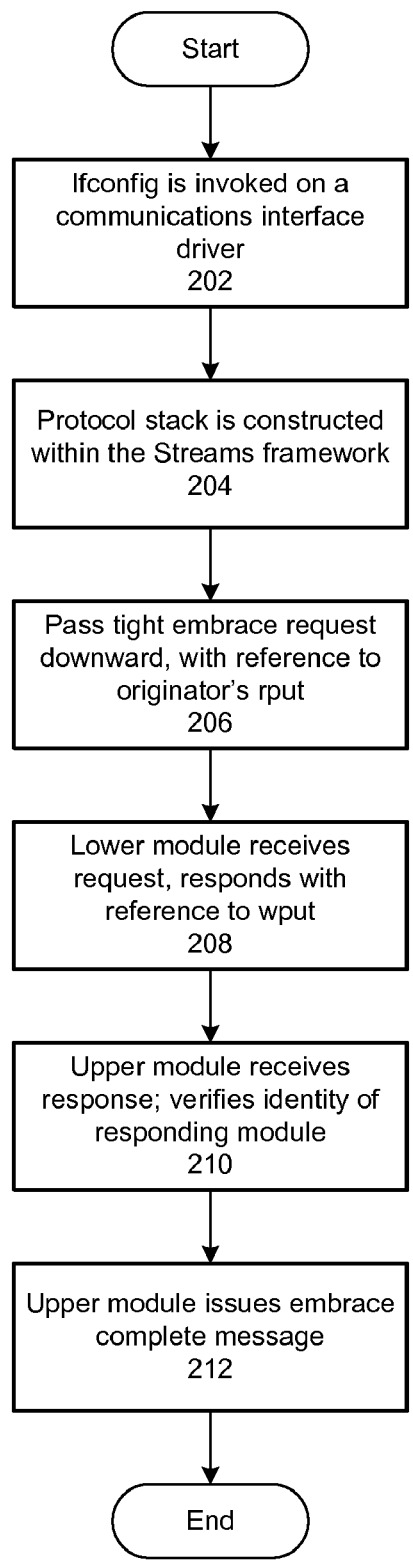
FIG. 2 is a flowchart illustrating one method of establishing a tight embrace within a protocol stack implemented within the Streams framework, in accordance with an embodiment of the invention.

FIG. 2 demonstrates a method of establishing a tight embrace to improve data communication through a protocol stack within a Streams system, according to one embodiment of the invention.

In operation 202, an ifconfig configuration file is invoked on a DLPI (Data Link Provider Interface) driver or communication interface driver.

In operation 204, a protocol stack is built on top of the device driver. Illustratively, the device driver is opened and attached, and other protocol layer modules (e.g., IP, TCP, sockfs) are pushed on top of the driver module.

In operation 206, creation of a tight embrace is initiated. For example, ifconfig may cause a first, upper, protocol layer module such as sockfs to send a tight embrace request control message to its adjacent, lower, module, such as TCP. Within the request message is a pointer or reference to the first module's rput function (and possibly rsrv), which is configured to read a data communication into the upper module from the lower module.

Illustratively, tight embrace requests are initiated by the upper layer protocol of two adjacent protocol layers. The lower will respond and then initiate a request to the next-lower layer, and so on. Each requestor may wait a predetermined period of time for a response before aborting a request. A requester may retry a failed request, and will eventually report upward that all lower-level protocols have completed their attempts to establish tight embraces. The upper-most protocol (e.g., sockfs) can then report completion to ifconfig.

In operation 208, the recipient of the tight embrace request message, the TCP module, determines whether it can participate in a tight embrace. If it cannot, it may simply respond with a failure or error message, but may still send a control message downward to the adjacent module to cause it to attempt a tight embrace with the next module.

However, if the TCP module is capable of a tight embrace, it will generate and return a message including a pointer or other reference to its wput function (and possibly wsrv), which is configured to write a data communication into the lower module from the upper module.

Until a tight embrace is established, each module may continue employing the standard canputnext and putnext Streams functions to pass communications through the Streams framework. If a tight embrace cannot be established, data communications may continue to be passed via the Streams framework (i.e., using the canputnext and putnext functions).

In operation 210, the upper module receives the tight embrace response. In this embodiment of the invention, the upper module verifies that the tight embrace response was sent by the lower module. In the Streams framework, a control message passed between modules may contain an identifier of the module that passed the message. The upper module may therefore compare the identifier within the response with an identifier of the module it expected to receive the response from.

This verification is useful because a protocol layer module may not be capable of a tight embrace. In this case, it would not recognize a tight embrace request message, and would simply pass it downward to the next module. If that next module is capable of a tight embrace, it will respond to the incapable module, and that response will be passed back up to the originator of the request. However, the identity of the responder will not match the identity of the module that the originator expected a response from, and therefore the tight embrace will fail.

Illustratively, if an originator of a tight embrace request message never receives a response, or receives an error, it may simply continue to employ the Streams framework's canputnext and putnext functions to pass data communications.

In operation 212, the upper module issues a tight embrace complete message, and each module can begin invoking the other module's function (i.e., rput or wput) to pass data communications to the other module.

In one embodiment of the invention, the upper module verifies that the tight embrace response was issued by the lower module before issuing the tight embrace complete message. For example, a message passed between modules may contain an identifier of the module that originated the message. The upper module may therefore compare the identifier within the response with an identifier of the module it expected to receive the response from.

This verification is useful because there may be a possibility of a protocol module not being capable of a tight embrace.

It may therefore not recognize a tight embrace request message, and simply pass it on to the next module. If that next module is capable of a tight embrace, it will respond, and that response will be passed back up to the originator of the request. However, the identity of the responder will not match the identity of the module that the originator expected a response from, and therefore the tight embrace will fail.

After operation 212, the illustrated method ends.

Operations 206-212 may be repeated as often as necessary to establish or to attempt to establish tight embraces between other protocol modules. Thus, a first tight embrace may be established between a sockfs module and an adjacent TCP module as described above. The TCP module may then initiate a second tight embrace with an adjacent IP module. The IP module may then initiate a third tight embrace with a device driver module, and so on.

Thus, from the top protocol layer on down, each protocol module may issue a tight embrace request message to its lower module neighbor. Whether the two modules successfully establish a tight embrace or not, the lower module duplicates the message and passes it to the next module.

In one alternative embodiment of the invention, the lower module may begin using (e.g., invoking) the upper module's rput function to cause it to read data communications into the upper module from the lower module immediately after responding to the tight embrace request. The lower module may first, however, verify that the request was received from the upper module (e.g., by examining the originating module's identifier in the request message).

Similarly, in this alternative embodiment, the upper module may begin using the lower module's wput function to write data communications into the lower module from the upper module as soon as the upper module receives the tight embrace response message (and, possibly, verifies that it is from the lower module). Thus, in this alternative embodiment, a tight embrace complete message may be unnecessary.

Tight embraces need not be established between all protocol modules in a communication stream. Some modules may continue to use the Streams framework to convey communications (via putnext) rather than convey them directly (via rput or wput). In the illustrated embodiment of the invention, tight embrace requests and responses are conveyed as control messages in the control plane, and therefore transit the Streams framework.

Figure 3:
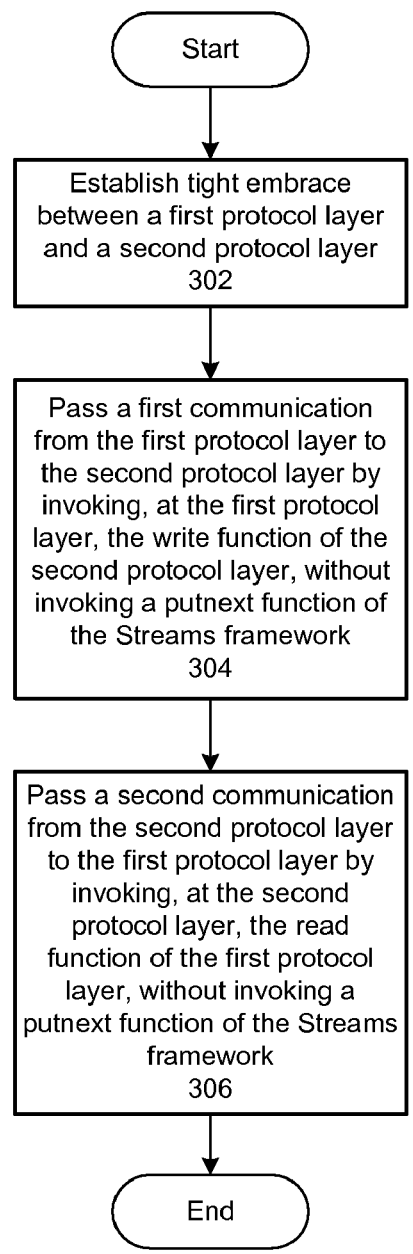
FIG. 3 is a flowchart illustrating one method of passing communication between two protocol layers after a tight embrace is established, in accordance with an embodiment of the invention.

FIG. 3 is a flowchart illustrating one method of passing communication between to protocol layers after a tight embrace is established, in accordance with an embodiment of the invention. The system first establishes a tight embrace between a first protocol layer and a second protocol layer (operation 302). The system then passes a first communication from the first protocol layer to the second protocol layer by invoking, at the first protocol layer, the write function of the second protocol layer, without invoking a putnext function of the Streams framework (operation 304). The system further passes a second communication from the second protocol layer to the first protocol layer by invoking, at the second protocol layer, the read function of the first protocol layer, without invoking a putnext function of the Streams framework (operation 304).

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated method of establishing a communication path through a protocol stack implemented within a Streams framework, the method comprising:
    (a) establishing a first tight embrace between a first protocol layer and a second protocol layer by:
        (a1) at the first protocol layer, issuing a first request to the second protocol layer, said first request identifying an entry point for a read function of the first protocol layer;
        (a2) at the second protocol layer:
            receiving said first request; and
            issuing a first response to the first request, said first response identifying an entry point for a write function of the second protocol layer; and
        (a3) at the first protocol layer, receiving said first response; and
    (b) establishing one or more additional tight embraces between other protocol layers.

2. The method of claim 1, further comprising, after said establishing a first tight embrace:
    passing a first communication from the first protocol layer to the second protocol layer by invoking, at the first protocol layer, the write function of the second protocol layer.

3. The method of claim 2, further comprising, after said establishing a first tight embrace:
    passing a second communication from the second protocol layer to the first protocol layer by invoking, at the second protocol layer, the read function of the first protocol layer.

4. The method of claim 3, wherein the second communication is passed without invoking a putnext function of the Streams framework.

5. The method of claim 2, wherein the first communication is passed without invoking a putnext function of the Streams framework.

6. The method of claim 1, wherein said first tight embrace allows a communication to be exchanged between the first protocol layer and the second protocol layer without invoking a putnext function of the Streams framework.

7. The method of claim 1, wherein:
    establishing the first tight embrace further comprises configuring said first response with an identifier of the second protocol layer; and
    receiving said first response comprises identifying an originator of said first response to ensure said first response was issued by the second protocol layer.

8. The method of claim 1, wherein receiving said first response further comprises:
    issuing a first completion message to the second protocol layer to inform the second protocol layer that said first tight embrace is established.

9. A computer readable medium storing instructions that, when executed by a computer, cause the computer to perform a method of establishing a communication path through a protocol stack implemented within a Streams framework, the method comprising:
    (a) establishing a first tight embrace between a first protocol layer and a second protocol layer by:
        (a1) at the first protocol layer, issuing a first request to the second protocol layer, said first request identifying an entry point for a read function of the first protocol layer;
        (a2) at the second protocol layer:
            receiving said first request; and
            issuing a first response to the first request, said first response identifying an entry point for a write function of the second protocol layer; and
        (a3) at the first protocol layer, receiving said first response; and
    (b) establishing one or more additional tight embraces between other protocol layers.

10. A computer-implemented method of establishing a tight embrace between a first protocol layer and a second protocol layer within a protocol stack implemented within a Streams framework, the method comprising:
    (a) at the first protocol layer, issuing a first request to the second protocol layer, said first request identifying an entry point for a receive message function of the first protocol layer;
    (b) at the second protocol layer:
        receiving said first request; and
        issuing a first response to the first request, said first response identifying an entry point for a write message function of the second protocol layer;
    (c) at the first protocol layer:
        receiving said first response; and
        determining whether said first response was issued by the second protocol layer; and
    (d) exchanging a communication between the first protocol layer and the second protocol layer without invoking a putnext function of the Streams framework.

11. A computer readable medium storing instructions that, when executed by a computer, cause the computer to perform a method of establishing a tight embrace between a first protocol layer and a second protocol layer within a protocol stack implemented within a Streams framework, the method comprising:
    (a) at the first protocol layer, issuing a first request to a second protocol layer, said first request identifying an entry point for a receive message function of the first protocol layer;
    (b) at the second protocol layer:
        receiving said first request; and
        issuing a first response to the first request, said first response identifying an entry point for a write message function of the second protocol layer;
    (c) at the first protocol layer:
        receiving said first response; and
        determining whether said first response was issued by the second protocol layer; and (d) exchanging a communication between the first protocol layer and the second protocol layer without invoking a putnext function of the Streams framework.

12. An apparatus for conveying data communications, the apparatus comprising:

a first protocol module configured to:

implement a first data communication protocol; and issue a first tight embrace request to a second protocol module, said first tight embrace request comprising a reference to a read communication function of the first protocol module;

the second protocol module, configured to:

implement a second data communication protocol;

respond to said first tight embrace request with a first response comprising a reference to a write communication function of the second protocol module; and issue a second tight embrace request to a third protocol module, said second tight embrace request comprising a reference to a read communication function of the second protocol module; and a Streams framework configured to provide a putnext function for passing a communication between protocol modules.

13. The apparatus of claim 12, wherein the first protocol module is further configured to:

issue a first tight embrace completion message to the second protocol module.

14. The apparatus of claim 13, wherein the first protocol module is further configured to:

verify an originator of said first response.

15. The apparatus of claim 13, wherein after issuing said first tight embrace completion message, the first protocol module is configured to convey a data communication to the second protocol module by invoking the write communication function of the second protocol module.

16. The apparatus of claim 13, wherein after receiving said first tight embrace completion message, the second protocol module is configured to convey a data communication to the first protocol module by invoking the read communication function of the first protocol module.

\* \* \* \* \*